(12) United States Patent
Raghavan et al.

(10) Patent No.: US 11,880,365 B2
(45) Date of Patent: Jan. 23, 2024

(54) MULTIMODAL AND DISTRIBUTED DATABASE SYSTEM STRUCTURED FOR DYNAMIC LATENCY REDUCTION

(71) Applicant: BANK OF AMERICA CORPORATION, Charlotte, NC (US)

(72) Inventors: Satish Raghavan, Tamil Nadu (IN); Anirudh Kumar Sharma, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/701,987

(22) Filed: Mar. 23, 2022

(65) Prior Publication Data

US 2023/0306025 A1    Sep. 28, 2023

(51) Int. Cl.
*G06F 16/2453*  (2019.01)
*G06F 16/25*  (2019.01)
*G06F 16/2452*  (2019.01)
*G06F 16/2458*  (2019.01)

(52) U.S. Cl.
CPC .... *G06F 16/24542* (2019.01); *G06F 16/2471* (2019.01); *G06F 16/24528* (2019.01); *G06F 16/256* (2019.01)

(58) Field of Classification Search
CPC ......... G06F 16/24542; G06F 16/24528; G06F 16/2471; G06F 16/256
See application file for complete search history.

(56) References Cited

U.S. PATENT DOCUMENTS

| | | |
|---|---|---|
| 6,122,636 A | 9/2000 | Malloy et al. |
| 6,651,055 B1 | 11/2003 | Kilmer et al. |
| 7,657,516 B2 | 2/2010 | Zaman et al. |
| 8,086,598 B1 | 12/2011 | Lamb et al. |
| 8,346,809 B2 | 1/2013 | Breining et al. |
| 8,380,699 B2 | 2/2013 | Al-Omari et al. |
| 8,660,985 B2 | 2/2014 | Wang et al. |
| 8,671,091 B2 | 3/2014 | Cherniack et al. |
| 8,700,674 B2 | 4/2014 | Bear et al. |
| 8,719,312 B2 | 5/2014 | Jin et al. |
| 8,996,559 B2 | 3/2015 | Ganti et al. |
| 9,009,099 B1 | 4/2015 | Djugash et al. |
| 9,311,349 B2 | 4/2016 | Herrnstadt |
| 9,336,253 B2 | 5/2016 | Gorelik et al. |

(Continued)

*Primary Examiner* — Dangelino N Gortayo
(74) *Attorney, Agent, or Firm* — Moore & Van Allen PLLC; Vaidehi Bachoti

(57) ABSTRACT

Embodiments of the invention are directed to a system, method, or computer program product for multimodal and distributed database system structured for dynamic latency reduction. In this regard, the invention comprises a unified data layer structured to map a plurality of data storage mechanisms to a common abstraction and a query engine structured for heterogenous domain based data extraction without requiring input of schema-based queries. In some embodiments, the invention comprises determining (i) one or more data components and (ii) one or more associated data domains associated with the first domain-based query by parsing the user input based on derived metadata from data dictionaries associated with a unified data layer system component. Moreover, the invention is configured to extract stored data from each of a plurality of databases based on the associated one or more data domains.

20 Claims, 8 Drawing Sheets

(56) References Cited

U.S. PATENT DOCUMENTS

| | | |
|---|---|---|
| 9,607,017 B2 | 3/2017 | Debray et al. |
| 9,659,045 B2 | 5/2017 | Liu et al. |
| 9,740,741 B2 | 8/2017 | Plattner et al. |
| 9,817,851 B2 | 11/2017 | Dumant et al. |
| 9,836,505 B2 | 12/2017 | Cheng et al. |
| 10,621,150 B2 | 4/2020 | Callan et al. |
| 2004/0215626 A1 | 10/2004 | Colossi et al. |
| 2005/0050068 A1 | 3/2005 | Zhu et al. |
| 2006/0212469 A1 | 9/2006 | Babanov et al. |
| 2006/0282423 A1 | 12/2006 | Al-Omari et al. |
| 2007/0027904 A1 | 2/2007 | Chow et al. |
| 2007/0294217 A1 | 12/2007 | Chen et al. |
| 2008/0033914 A1 | 2/2008 | Cherniack et al. |
| 2008/0281784 A1 | 11/2008 | Zane et al. |
| 2010/0121869 A1 | 5/2010 | Biannic |
| 2012/0016678 A1* | 1/2012 | Gruber ................ G06F 16/3329 704/E21.001 |
| 2013/0226959 A1 | 8/2013 | Dittrich et al. |
| 2014/0164353 A1 | 6/2014 | Shankar et al. |
| 2018/0113903 A1* | 4/2018 | Rana ................ G06F 16/24535 |
| 2018/0308485 A1* | 10/2018 | Kudurshian .......... G06F 16/951 |
| 2019/0057116 A1 | 2/2019 | Cohen et al. |
| 2019/0147880 A1* | 5/2019 | Booker ................... G06F 3/167 704/251 |
| 2019/0163838 A1* | 5/2019 | Ramachandra Iyer ...................... G06F 16/90344 |
| 2020/0097490 A1* | 3/2020 | Pandey ............. G06F 16/24522 |
| 2022/0028387 A1* | 1/2022 | Walker, II ............... G10L 13/02 |

\* cited by examiner

MULTIMODAL AND DISTRIBUTED DATABASE SYSTEM STRUCTURED FOR DYNAMIC LATENCY REDUCTION

FIELD OF THE INVENTION

The present invention is directed to database systems having entity data stored thereon, and a novel domain query based data retrieval from the database systems. In particular, the present invention embraces a novel approach for a physical analytical system using microservice based architecture that provides a unified interface.

BACKGROUND

Entity networks are associated with immense data and information that is stored at numerous databases. Traditional databases typically arrange data within tables and employ join algorithms to establish relationships between sets of data. Data from such databases is operated upon by conventional analytical systems. Typically, conventional analytical systems have a monolithic architecture. Such conventional systems, due to their inherent nature, are typically riddled with high latency, time lag, and burdensome computational cost for querying relationships and other undesirable issues. Moreover, the very nature of monolithic architecture causes an error or obsolete data in any data domain to adversely affect the functionally of entire analytical system. Typically, real time analytics is not possible in monolithic analytical systems, because there is latency between the systems. Accordingly, there is a need for an advanced systems that addresses the above technical problems in existing systems.

The previous discussion of the background to the invention is provided for illustrative purposes only and is not an acknowledgement or admission that any of the material referred to is or was part of the common general knowledge at the priority date of the application.

SUMMARY

In one aspect, the present invention is directed to in general a system, method and computer program product for a multimodal and distributed database system structured for dynamic latency reduction. The system comprises a unified data layer structured to map a plurality of data storage mechanisms to a common abstraction and a query engine structured for heterogenous domain based data extraction without requiring input of schema-based queries. Users may query data from heterogeneous systems using a unified query engine, without requiring proficiency of myriad schema.

Embodiments of the invention further comprise a memory device with computer-readable program code stored thereon, a communication device, wherein the communication device is configured to establish operative communication with a plurality of networked devices via the entity communication network, and a processing device operatively coupled to the memory device and the communication device, wherein the processing device is configured to execute the computer-readable program code. That said, in some embodiments, the invention takes the form of a computer program product comprising one or more non-transitory computer-readable storage media having computer-executable instructions that when executed by one or more processing devices are configured to cause the one or more processing devices to perform one or more functions described below. In some embodiments, the invention takes the form of a method for performing one or more functions described below.

Typically, in some embodiments of the invention, the processing device is configured to execute the computer-readable program code to: receive, from a user device, a user input associated with a request for extracting one or more data components from one or more data sources; transform the user input into a first domain-based query; determine (i) one or more data components and (ii) one or more associated data domains associated with the first domain-based query by parsing the user input based on derived metadata from data dictionaries associated with a unified data layer system component; determine a plurality of databases associated with the determined one or more data domains; construct a plurality of split domain-based queries based on the first domain-based query, comprising constructing a split domain-based query for each of the plurality of databases, wherein each of the plurality of split domain-based queries is associated with at least one of the one or more data domains; extract stored data from each of the plurality of databases based on the associated plurality of split domain-based queries associated with the one or more data domains; construct a data output using the extracted data from the plurality of databases based on the one or more data components of the user input; and transmit the data output to the user device and cause a presentation of the data output at a display device of the user device.

In another embodiment, and in combination with any of the previous embodiments, the first domain-based query is a Structured Query Language (SQL) query.

In another embodiment, and in combination with any of the previous embodiments, the invention is configured to: synchronize data from the one or more databases with the unified data layer system component based on a data domain-database mapping component.

In another embodiment, and in combination with any of the previous embodiments, constructing the plurality of split domain-based queries, further comprises: splitting the first domain-based query based on at least the one or more data components to generate one or more split first queries; in parallel with the splitting the first domain-based query, optimizing the first domain-based query to be compatible with the unified data layer system component; extracting data from each of the plurality of databases via the corresponding one or more split first queries, in response to determining that optimization of the first domain-based query is complete; and in parallel with the data extraction, generating a query plan.

In another embodiment, and in combination with any of the previous embodiments, splitting the first domain-based query, further comprises: determining one or more servers associated with each of the plurality of databases; determining stored data to be extracted from each of the one or more servers associated with each of the plurality of databases; and generating the one or more split first queries to be compatible with the associated one or more servers.

In another embodiment, and in combination with any of the previous embodiments, splitting the first domain-based query, further comprises: constructing a data pointer for each of the one or more servers; and embedding the one or more data pointers into the one or more split first queries.

In another embodiment, and in combination with any of the previous embodiments, extracting data from each of the plurality of databases, further comprises: establishing operative communication links with each of the one or more servers associated with each of the plurality of databases, and extracting data from the one or more servers associated with each of the plurality of databases via the corresponding one or more split first queries.

In another embodiment, and in combination with any of the previous embodiments, the invention is configured to: collate, temporarily, the extracted data from the plurality of databases based on the associated plurality of split domain-based queries associated with the one or more data domains in a temporary staging memory location.

In another embodiment, and in combination with any of the previous embodiments, the invention is configured to: process metadata associated with the plurality of databases, dynamically and in real-time; determine, dynamically and in real-time, a change in data storage at a database based on identifying a modification to the metadata; and update the data dictionaries associated with a unified data layer system component based on the modification to the metadata.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
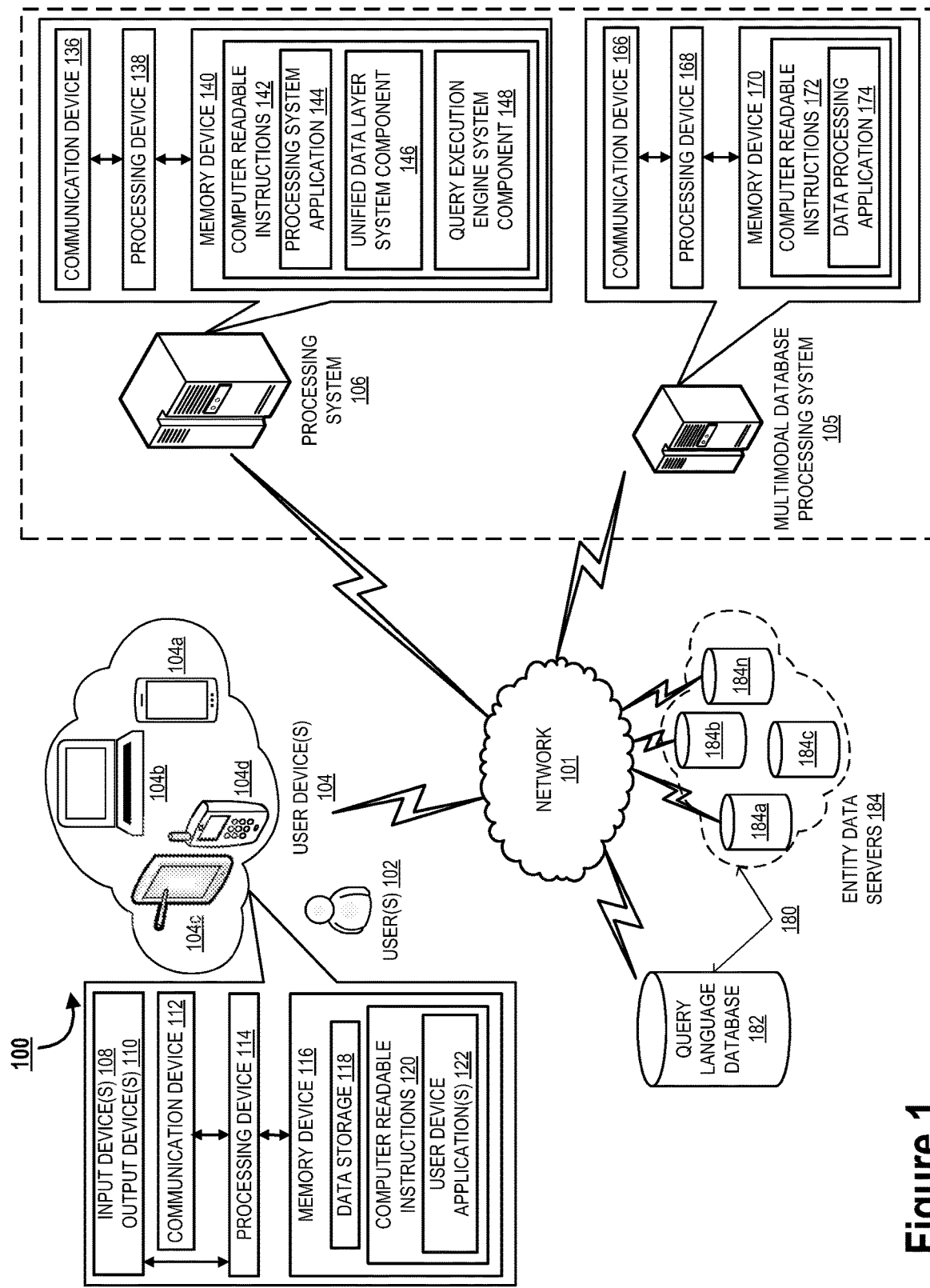
Figure 2:
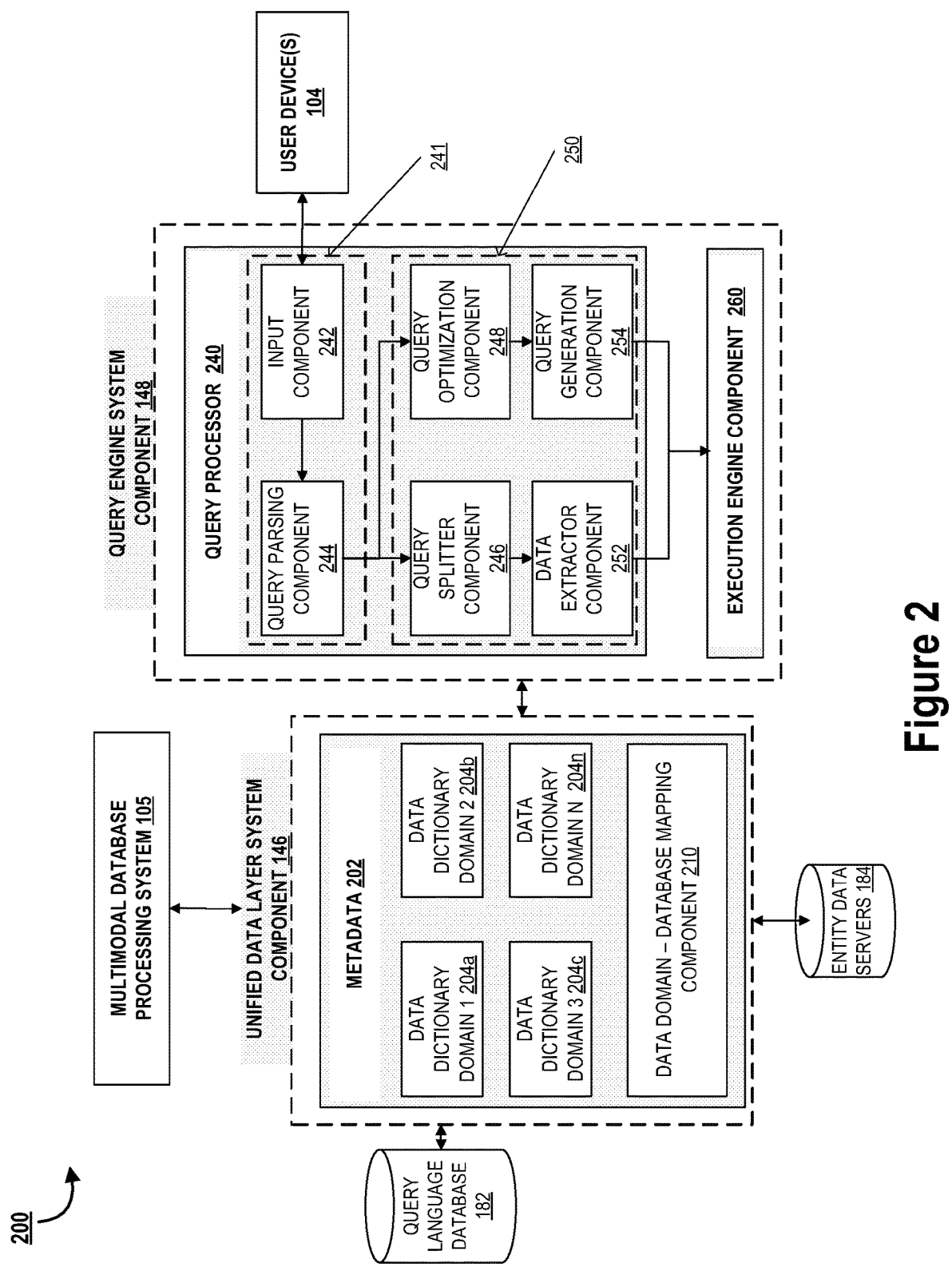
Figures 3A, 3B:
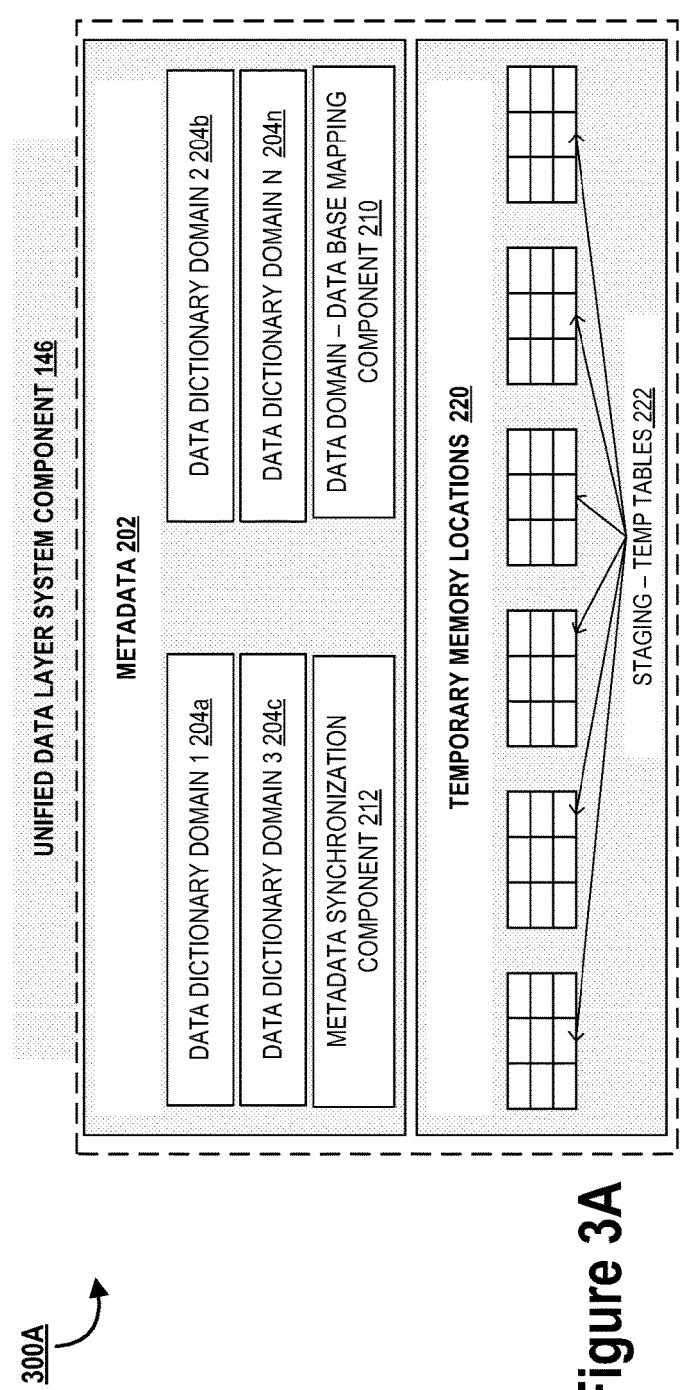
Figure 4:
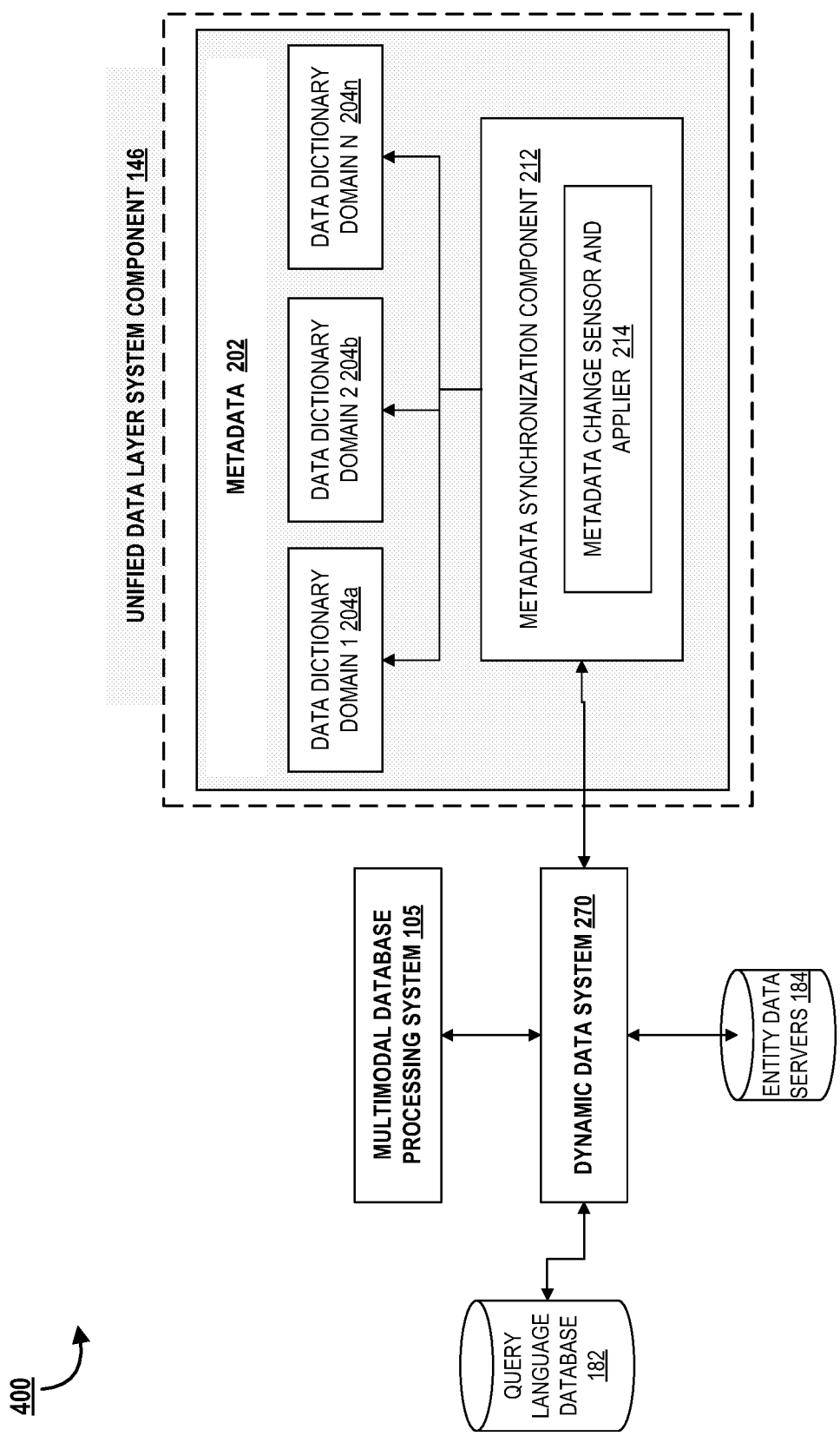
Figure 5:
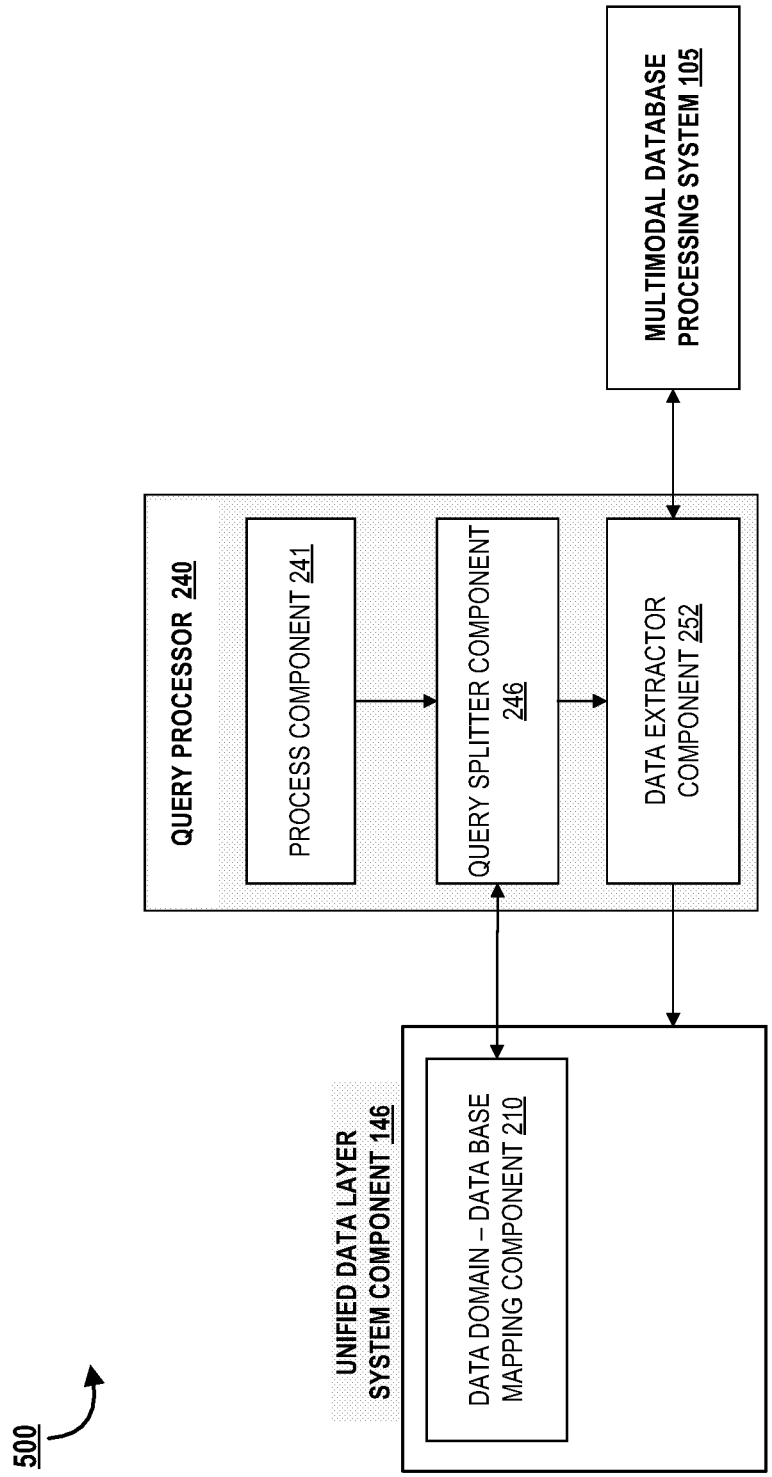
Figure 6:
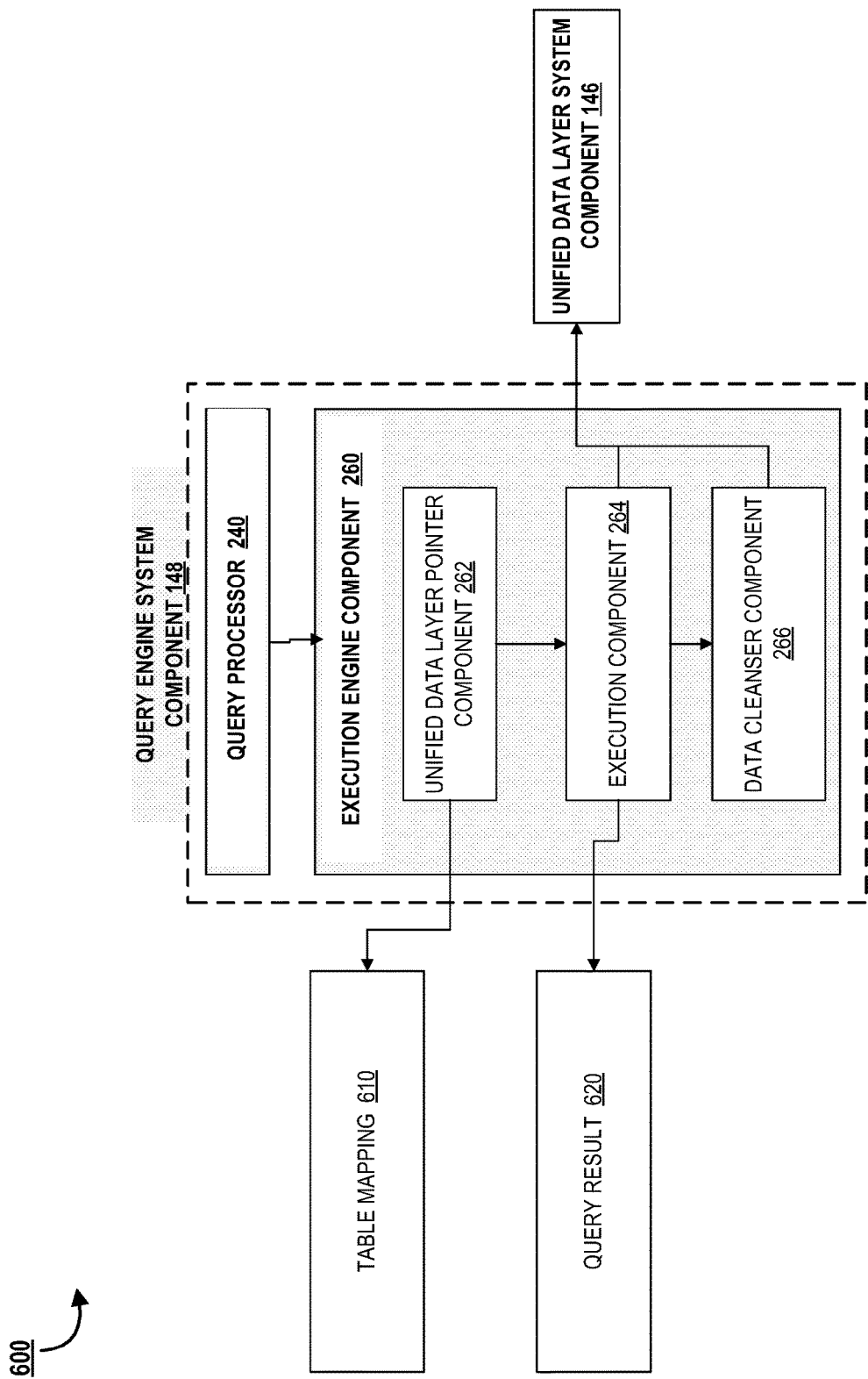
Figure 7A:
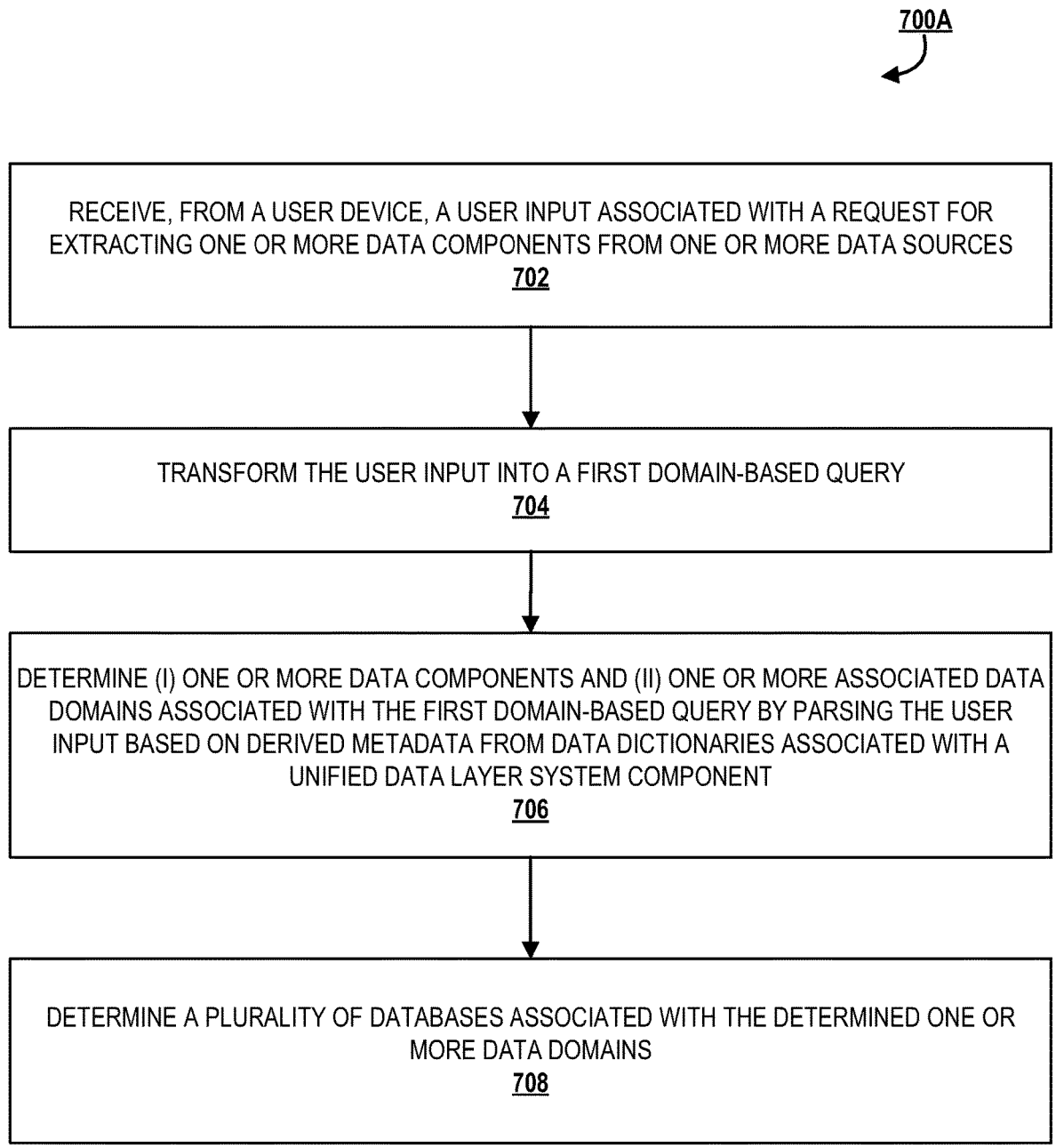
Figure 7B:
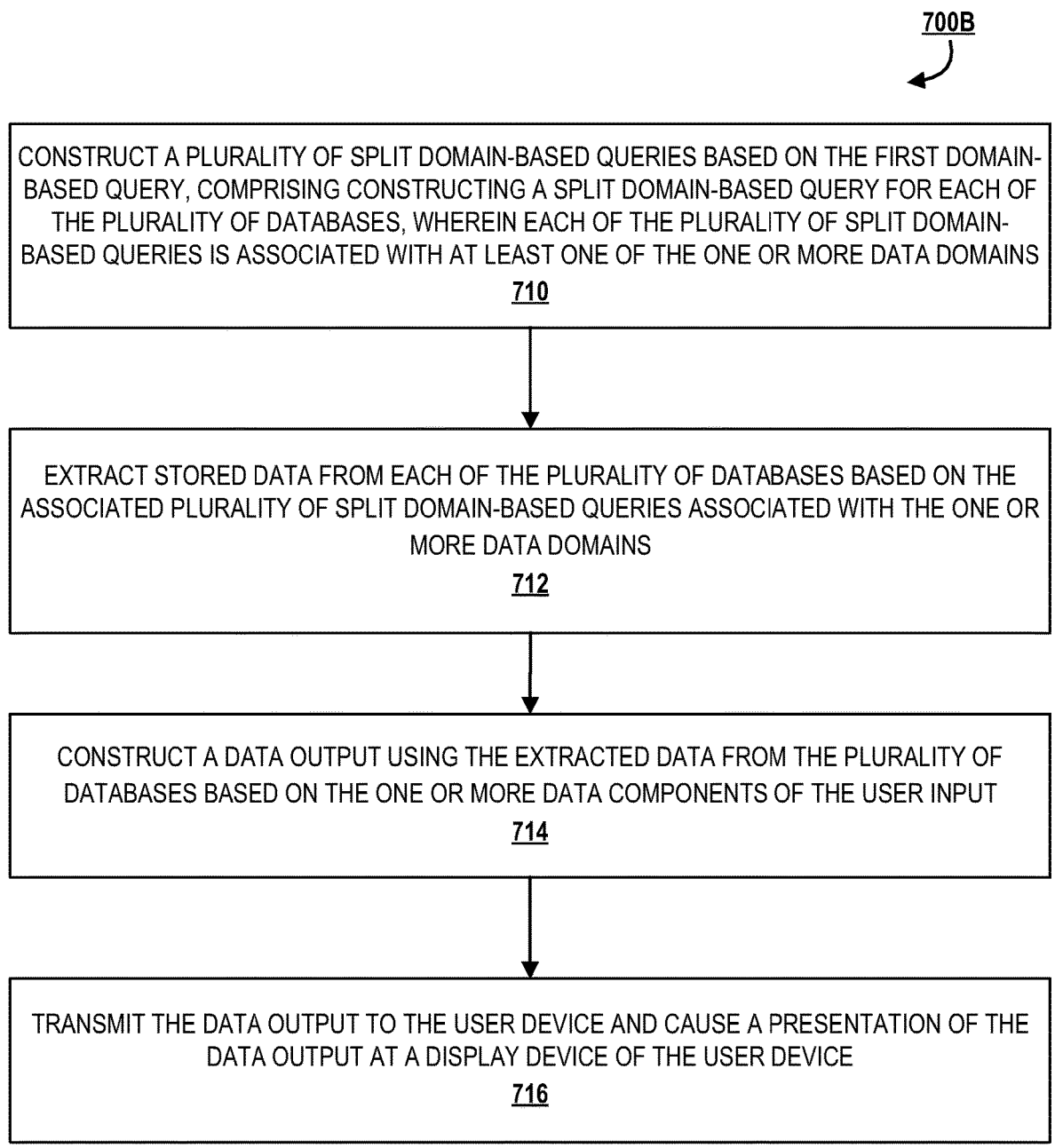

Having thus described embodiments of the invention in general terms, reference will now be made the accompanying drawings, wherein:

FIG. 1 depicts a system environment 100 for multimodal and distributed database system, in accordance with an aspect of the present invention;

FIG. 2 depicts a schematic block diagram and process flow depiction 200 of a microservice based analytical system having a unified data layer system component and query engine system component, in accordance with one embodiment of the invention;

FIG. 3A depicts a schematic block diagram depiction 300A of a unified data layer system component, in accordance with one embodiment of the invention;

FIG. 3B depicts a non-limiting exemplary depiction 300B of a data domain-database mapping component, in accordance with one embodiment of the invention;

FIG. 4 depicts a schematic block diagram and process flow depiction 400 of metadata synchronization, in accordance with one embodiment of the invention;

FIG. 5 depicts a schematic block diagram and process flow depiction 500 of a query processor, in accordance with one embodiment of the invention;

FIG. 6 depicts a schematic block diagram and process flow depiction 600 of a query engine system component, in accordance with one embodiment of the invention;

FIG. 7A schematically depicts a high level process flow 700A for multimodal and distributed database system structured for dynamic latency reduction, in accordance with one embodiment of the invention; and FIG. 7B schematically depicts a high level process flow 700B for multimodal and distributed database system structured for dynamic latency reduction, in accordance with the embodiment of FIG. 7A.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be an organization, a company, a group, an institution, a society, an association, an establishment or the like, (e.g., a financial institution, a business concern, a merchant organization, etc.). For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. In other embodiments, an "entity" may not be a financial institution.

Unless specifically limited by the context, a "user activity", "transaction" or "activity" refers to any communication between the user and a financial institution or another entity. In some embodiments, for example, a user activity may refer to a purchase of goods or services, a return of goods or services, a payment transaction, a credit transaction, or other interaction involving a user's bank account. As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

A "user" may be an individual or group of individuals associated with an entity that provides the system for assessing network authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

As used herein, a "user interface" or "UI" may be an interface for user-machine interaction. In some embodiments the user interface comprises a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. In some embodiments the user interface comprises one or more of an adaptive user interface, a graphical user interface, a kinetic user interface, a tangible user interface, and/or the like, in part or in its entirety.

In some embodiments, a "domain" may refer to an object that defines technical and semantic attributes of data types. Data elements can be defined with reference to a domain and inherit its attributes. In some embodiments, data domain may refer to the collection of data associated with a data component.

Entity networks are associated with immense data and information that is stored at numerous databases. Traditional databases typically arrange data within tables and employ join algorithms to establish relationships between sets of data. Data from such databases is operated upon by conventional analytical systems. Typically, conventional analytical systems have a monolithic architecture, which inherently causes analytical system and data domains to be integrated tightly. In such conventional systems, data from all the operational systems in an entity network feeds into data warehouses, and subsequently analytics on the extracted data is performed in a disparate centralized system. Due to their inherent nature, scaling such monolithic systems and applications, even if possible in the first place, may not be achievable beyond a certain limit. These conventional systems typically cannot identify any changes in a timely matter. As the data and relationships amongst the data become increasingly complex, latency, time lag, and computational cost of querying relationships becomes highly burdensome for the computing systems which host the database, particularly every time changes are implemented, which may occur frequently. In conventional systems, schema based queries become outdated or obsolete due to changes to the data at the database level. Unwittingly utilizing the obsolete schema results in undesirable errors. An error or obsolete data in any data domain can impair and damage the functionally of entire analytical system because of the tight integration of the data domains. Typically, real time analytics is not possible in monolithic analytical systems, because there will always be latency between the systems. For instance, by the very nature of conventional systems, there is latency between online transaction processing (OLTP) systems which capture, store, and process data from activities in real time, and online analytical processing (OLAP) systems which analyze aggregated historical data from OLTP systems. Here, data needs to be replicated in both OLAP and PLTP systems resulting in redundancy. Accordingly, there is a need for an advanced systems that addresses the above technical problems in existing systems.

The present invention solves the foregoing problems in conventional technology and provides additional advantages as well. Here, the present invention employs a multimodal and distributed database structure, instead of a monolithic architecture. In some instances of the invention, data domains are generated using loosely coupled microservice based architectures. The present invention is structured to capture changes and updates from entity network systems. Moreover, data from a domain may be integrated together such that it is compatible for a unified query engine, which is structured for running SQL database queries. As such, the system comprises a unified data layer structured to map a plurality of data storage mechanisms to a common abstraction and a query engine structured for heterogenous domain based data extraction without requiring input of schema-based queries. Users query data from these heterogeneous systems using the unified query engine, without requiring proficiency of myriad schema. In some instances of the invention, the unified query engine is developed for ANSI standard of SQL. Moreover, the unified database management system of the present invention may be built using C++, C, Java, and/or the like.

In one aspect of the present invention, the system is structured to extract data from databases irrespective of the particular database where the domain is hosted. In this regard, the system generates an individual query for each database, and separately extracts data from each database, and subsequently processes the extracted data to generate a cross-pollinated output. As discussed above, unwittingly utilizing the obsolete schema results in undesirable errors. Because, in the novel present invention, the data is extracted directly from the databases based on identifying the domains, the foregoing drawbacks of conventional systems are mitigated. Moreover, the system continually monitors the databases for changes. Any identified change is replicated across the analytical platform of the multimodal and distributed database system, dynamically and in real-time. Moreover, if any corrupt or incorrect data is identified at the source database, the preset invention modifies the domain based queries in real-time to ensure that the extracted data is accurate. As such, the queries of the present invention are structured to resolve issues in run-time.

FIG. 1 illustrates a system environment 100 for multimodal and distributed database system, in accordance with one embodiment of the present invention. FIG. 1 provides a unique system that includes specialized servers and systems, communicably linked across a distributive network. As illustrated in FIG. 1, a multimodal database processing system 105 (also referred to as the system 105 in some instances) is operatively coupled, via a network 101 to the user system(s) 104 (e.g., a plurality of user devices 104a-104d), to the processing system 106 (also referred to as a control system 106) and to a plurality of other networked systems and devices. In this way, the multimodal database processing system 105 can send information to and receive information from the user device(s) 104, the processing system 106 (e.g., a financial institution server) and the database(s) 180 (e.g., query language database 182, entity data servers 184 (e.g., first entity database 184a, second entity database 184b, third entity database 184c, . . . , $N^{th}$ entity database 184n, and/or the like), and/or the like). FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and structured for facilitating data flows associated with activities and tasks associated with the entity. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves, light waves or any other suitable means. In some embodiments, at least a portion of the network 101 is an entity communication network associated with the entity.

In some embodiments, the multimodal database processing system 105 and the database(s) 180 (e.g., query language database 182, entity data server 184, and/or the like), together with the processing system 106 are associated with an entity. In some embodiments, the multimodal database processing system 105, and the processing system 106 are embodied in a single system. Typically, the network nodes (e.g., the database(s) 180 (e.g., query language database 182, entity data servers 184 (e.g., first entity database 184a, second entity database 184b, third entity database 184c, . . . , $N^{th}$ entity database 184n, and/or the like), and/or the like), the multimodal database processing system 105, the processing system 106, and/or the user device(s) 104) comprise operative communication channels for communicating with each other.

In some embodiments, the user 102 is an individual that has, owns or is otherwise associated with one or more user devices 104, and typically a plurality of user devices 104, that facilitate/allow the user to perform one or more user activities. The user devices typically comprise one or more of a smart phone 104a, a laptop or desktop computer 104b, a mobile phone or a personal digital assistant 104d, a tablet device 104c, wearable smart devices, smart television devices, home controllers, smart speakers, and/or other computing devices. In some embodiments, the user may be associated with a first user device (e.g., the tablet device 104c, a laptop or desktop computer 104b, or another smart/computing device) and a second user device (e.g., the smart phone 104a, or any of the user devices listed above).

FIG. 1 also illustrates a representative user system/device 104. As discussed, the user device(s) 104 may be, for example, a desktop personal computer, a mobile system, such as a cellular phone, smart phone, personal digital assistant (PDA), laptop, or the like, and each of the user devices (e.g., devices 104a-104d) may comprise the technical/electronic components described herein. The user device(s) 104 generally comprises a communication device 112, a processing device 114, a memory device 116, input device(s) 108 and output device(s) 110. The user device 104 may comprise other devices that are not illustrated, configured for location determination/navigation (GPS devices, accelerometers and other positioning/navigation devices), for authentication (fingerprint scanners, microphones, iris scanners, facial recognition devices/software and the like), for image capture (cameras, AR devices, and the like), for display (screens, hologram projectors and the like), and other purposes. The user device 104 is a computing system that enables the user to perform one or more user activities or tasks associated with the entity. The processing device 114 is operatively coupled to the communication device 112, input device(s) 108 (e.g., keypads/keyboards 108a, touch screens 108b, mouse/pointing devices 108c, gesture/speech recognition sensors/devices, microphones, joysticks, authentication credential capture devices listed above, image capture devices, and other peripheral input devices), output device(s) 110 (screens 110a-110b, speakers, printers and other peripheral output devices) and other devices/components of the user device. The processing device 114 uses the communication device 112 to communicate with the network 101 and other devices on the network 101, such as, but not limited to the processing system 106, the multimodal database processing system 105 and/or the like. As such, the communication device 112 generally comprises a modem, server, or other device for communicating with other devices on the network 101.

Each user device 104a-104d, typically comprises one or more user input devices 108, that are configured to receive instructions, commands, data, authentication credentials, audio/visual input and other forms of user input from the user, and transmit the received user input to the processing device 114 of the user device for processing. Similarly, each user device 104a-104d, typically comprises one or more user output devices 110, that are configured to transmit, display (e.g., via a graphical user interface), present, provide or otherwise convey an user output to the user, based on instructions from the processing device 114 of the user device. In some embodiments, the one or more user input devices 108 and/or one or more user output devices 110 are dual-function devices that are configured to both receive user input from the user and display output to the user (e.g., a touch screen display of a display device). For example, the dual function input devices 108 and/or the output devices 110 may present a user interface associated with one or more user device applications 112 (e.g., a graphical user interface) that is configured to receive user input and also provide user output.

The user device 104 comprises computer-readable instructions 120 and data storage 118 stored in the memory device 116, which in one embodiment includes the computer-readable instructions 120 of one or more user applications 122 (e.g., technology applications such as operating system applications, device applications, third party applications, browser applications, network applications, and the like) that facilitate performance of one or more activities associated with the entity. In some embodiments, the first device application of the one or more user applications 122 refers to an application stored on the user device that is configured to receive user instructions/input via an associated first user interface, and in accordance with the user input perform one or more tasks or activities and associated steps (e.g., requesting information, retrieving/receiving information, perform searches, query other applications/servers, and/or the like) whose data flow through the network is desired to be evaluated in real-time or near real-time.

As discussed, in some embodiments, the user device 104 may refer to multiple user devices that may be configured to communicate with the multimodal database processing system 105 via the network 101. In some embodiment, the multimodal database processing system 105, the processing system and/or the database(s) 180 (e.g., query language database 182, entity data servers 184 (e.g., first entity database 184a, second entity database 184b, third entity database 184c, . . . , $N^{th}$ entity database 184n, and/or the like), and/or the like) may transmit control signals to the user device, configured to cause the technology application 122 to perform one or more functions or steps associated with data retrieval, in real-time or near real-time.

Typically, the data associated with the entity network may be stored at entity data servers 184, which may take the form of data warehouses in some embodiments. Here, the entity data servers 184 may comprise numerous databases such as entity data servers 184 such as first entity database 184*a*, second entity database 184*b*, third entity database 184*c*, . . . , Nth entity database 184*n*, and/or the like, e.g., with each database being associated with a functional area of the entity. Typically, each of the first entity database 184*a*, second entity database 184*b*, third entity database 184*c*, . . . , Nth entity database 184*n*, and/or the like may store data associated with one or more domains and may be heterogenous and may be associated with and/or require their own differing underlying technology, rules, and schema. Moreover, the query language database 182 may be associated with one or more domain-based databases.

As further illustrated in FIG. 1, the multimodal database processing system 105 (also referred to as the system 105) generally comprises a communication device 166, at least one processing device 168, and a memory device 170. As used herein, the term "processing device" or "processor" (e.g., processing devices 114, 138, and 168) generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 168 is operatively coupled to the communication device 166 and the memory device 170. The processing device 168 uses the communication device 166 to communicate with the network 101 and other devices on the network 101, such as, but not limited to the processing system 106, the user system 104 and the database(s) 180 (e.g., query language database 182, entity data servers 184 (e.g., first entity database 184*a*, second entity database 184*b*, third entity database 184*c*, . . . , $N^{th}$ entity database 184*n*, and/or the like), and/or the like). As such, the communication device 166 (and/or communication devices 112, and 136) generally comprises a modem, server, or other device for communicating with other devices on the network 101.

As further illustrated in FIG. 1, the multimodal database processing system 105 comprises computer-readable instructions 172 stored in the memory device 170, which in one embodiment includes the computer-readable instructions 172 of a data processing application 174 (also referred to as a system application), typically structured and configured by the processing system 106. In some embodiments, the memory device 170 includes data storage 171 (not illustrated) for storing data related to the system environment, but not limited to data created and/or used by the data processing application 174. In some embodiments, the data processing application 174 is configured for testing data transmission characteristics of the entity communication network and evaluating data flows associated in individual applications, in real-time or near real-time, by the processing system application 144 of the processing system 106. Specifically, executing computer readable instructions of 172 of the data processing application 174 is configured to cause processing device 168 to transmit certain control instructions to the one or more network nodes to cause their respective processing devices to carry out one or more steps described herein. The multimodal database processing system 105 may communicate with the processing/control system 106, the user device 104, the database(s) 180 (e.g., query language database 182, entity data servers 184 (e.g., first entity database 184*a*, second entity database 184*b*, third entity database 184*c*, . . . , $N^{th}$ entity database 184*n*, and/or the like), and/or the like), merchant systems and other third party systems (not illustrated) to perform one or more steps described herein, and/or cause these systems to perform one or more of these steps, at least in part.

In some embodiments, the data processing application 174 may control the functioning of the user device 104 and/or other database(s) 180 (e.g., query language database 182, entity data servers 184 (e.g., first entity database 184*a*, second entity database 184*b*, third entity database 184*c*, . . . , $N^{th}$ entity database 184*n*, and/or the like), and/or the like). In some embodiments, the data processing application 174 comprises computer readable instructions 172 or computer-readable program code 172, when executed by the processing device 168, causes the processing device to perform one or more steps involved in data extraction, dynamic latency reduction, and data analytics and/or to transmit control instructions to other systems and devices to cause the systems and devices to perform specific tasks. In some embodiments, the multimodal database processing system 105 and the processing system 106 may be embodied in the same system, or alternatively, the multimodal database processing system 105 and the processing system 106 may be separate systems as illustrated by FIG. 1.

Moreover, as illustrated in FIG. 1, the processing system 106 or control system 106 (also referred to as a entity system or a financial institution system 106) is connected to the multimodal database processing system 105 and the database(s) 180 (e.g., query language database 182, entity data server 184, and/or the like) and is associated with an entity network, and is an overarching system that is structured to configure the data processing application 174 for converting the multimodal database processing system 105 into a dedicated workstation. In this way, while only one processing system 106 is illustrated in FIG. 1, it is understood that multiple network systems may make up the system environment 100. The processing system 106 generally comprises a communication device 136, a processing device 138, and a memory device 140. The processing system 106 comprises computer-readable instructions 142 stored in the memory device 140, which in one embodiment includes the computer-readable instructions 142 of a processing system application 144. These devices are similar in structure and functions as those described above. The processing system 106 may communicate with an authentication system 107 (not illustrated) to provide authentication credentials for user activities.

The processing system 106 further comprises a unified data layer system component 146 and a query execution engine system component 148, which are depicted in detail at FIGS. 2-6. Typically, the unified data layer system component 146 is structured for controlling, operating upon, or otherwise interacting with heterogenous systems (e.g., entity data servers 184 such as first entity database 184*a*, second entity database 184*b*, third entity database 184*c*, . . . , $N^{th}$ entity database 184*n*, and/or the like) which are associated with varied and differing schema. Here, the unified data layer system component 146 is structured to map different storage mechanisms to common abstraction, such that the various schemas of the various databases is updated at the unified data layer system component 146 in real time. In some embodiments, the unified data layer system component 146 extracts and collates data from different data sources together to present a single view of data of the entity network 101. The query execution engine system component 148 is structured to synchronize data between the various functional areas and associated databases 184 of the entity. Here, the query execution engine system component 148 is structured to process domain-based queries (instead of requiring schema-based queries).

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 depicts a schematic block diagram and process flow depiction 200 of a microservice based analytical system having a unified data layer system component 146 and query engine system component 148, in accordance with one embodiment of the invention. The system is structured to extract data from databases irrespective of the particular database where the domain is hosted. In this regard, the system generates an individual query for each database, and separately extracts data from each database, and subsequently processes the extracted data to generate a cross-pollinated output.

As illustrated, the query execution engine system component 148 comprises a query processor 240, which in-turn comprises process components 241 (an input component 242, and a query parsing component 244), and parallel processing components 250 (a query splitter component 246, a query optimization component 248, a data extractor component 252 and a query generation component 254). The query execution engine system component 148 further comprises an execution engine component 260. Moreover, the query execution engine system component 148 is in operative communication with the unified data layer system component 146. The unified data layer system component 146 comprises metadata 202, one or more data dictionaries (data dictionary domain 1 204a, data dictionary domain 2 204b, data dictionary domain 3 204c, . . . , and/or data dictionary domain N 204n), and a data domain-database mapping component 210. The unified data layer system component 146 will be described in detail with respect to FIGS. 3A-3B. The unified data layer system component 146 is operatively coupled to query language database 182, entity data servers 184 (e.g., first entity database 184a, second entity database 184b, third entity database 184c, . . . , $N^{th}$ entity database 184n, and/or the like). In some embodiments, the term "component", "engine" or "unit" as used herein may refer to a functional assembly (e.g., packaged functional assembly) of one or more associated electronic components and/or one or more associated technology applications, programs, and/or machine readable/executable program codes. Moreover, in some instances, a "component", "engine" or "unit" together with the constituent electronic components and/or associated technology applications/programs/codes may be independently operable and/or may form at least a part of the system architecture. In some embodiments, the term "component", "engine" or "unit" as used herein may refer to at least a section of a one or more associated technology applications, programs, and/ or codes and/or one or more associated electronic components.

Initially, a user input from a user device 104 associated with a request for extracting one or more data components from one or more data sources is transmitted to the input component 242. Here, the user may select the data components such as functional areas of entities and/or associated domains (e.g., network event type 1, entity location B, and/or the like) from which data is desired, via the user device application 122. In some instances, data domain may refer to the collection of data associated with the data component. As discussed previously, conventional systems can only accept schema based queries. However, the query execution engine system component 148 (in conjunction with the unified data layer system component 146) allows for domain-based inputs and queries, while still allowing use of conventional databases that require schema based queries and without requiring replacement of the network systems in their entirety. In this manner, the query execution engine system component 148 of the present invention provides additional improvements and advantages by adapting, configuring, and transforming existing heterogenous schema based databases and other network hardware into being compatible with domain based inputs, which would not be possible in the absence of the present invention. In conventional systems, the user input is required to be schema based, and the user is required to be proficient in the same. However, any changes to the schema at the source databases where the data is hosted would cause the schema based user input to deliver obsolete or inaccurate results due to changes at the source systems. The domain based approach of the invention overcomes the foregoing disadvantages.

In some embodiments, the input component 242 is structured to transform the user input into a first domain-based query, wherein the first domain-based query is a Structured Query Language (SQL) query. As discussed, the user may merely select the functional areas of entities and/or associated domains from which data is desired or provide the user input in a natural/spoken language format, via the user device application 122. The input component 242 is structured to analyze the user's selections and transform them into the first domain-based query. Here, the input component 242 is structured to construct the first domain-based query by constructing normalized terminology for the user's selections, determine and insert query operators (e.g., query operators such as "join", etc.), and transform the user input to a domain based format.

The query parsing component 244 is structured to analyze the first domain-based query constructed by the input component 242. Here, the query parsing component 244 is structured to determine one or more data components (e.g., network event type 1, entity location B, and/or the like) whose domain data the user desires, by identifying the associated terminology in the user input. In this regard, the query parsing component 244 is structured to invoke metadata 202 associated with data dictionary domains 204 (204a, 202b, 204c, . . . , 204n) of the unified data layer system component 146. The query parsing component 244 is further structured to determine one or more associated data domains associated with the first domain-based query by parsing the user input based on derived metadata 202 from data dictionaries (204a, 202b, 204c, . . . , 204n) and data domain-database mapping component 210 associated with the unified data layer system component 146. Here, the query parsing component 244 may determine that the user request and the one or more data components are associated with data domains "Domain 1" and "Domain 3" based on comparing extracted and transformed data from the user request with metadata 202 from data dictionaries 204a-204n.

The parallel processing components 250, i.e., the query splitter component 246, the query optimization component 248, the data extractor component 252 and the query generation component 254), as structured to operate in parallel as described herein. Typically, the query splitter component 246 operates in parallel with the query optimization component 248. Moreover, the data extractor component 252 operates in parallel with the query generation component 254, such that the data extractor component 252 and the query generation component 254 commence operations at the same time. In other words, the data extractor component 252 only starts its functions, upon completion of the functions by the query generation component 254 in the parallel track (even though there may not be data transmission therebetween); and/or the query generation component 254 only starts its functions, upon completion of the functions by the query splitter component 246 in the parallel track.

The query splitter component 246 is structured to automatically split the constructed first domain-based query into one or more split first queries. Here, the query splitter component 246 is structured to determine a plurality of databases (e.g., databases 184a-184n, and/or the like) associated with the determined one or more data domains in the user input. As an example, the query splitter component 246 may determine that "Domain 1" is associated with source system databases "DB01", "DB02", and "DB03" where its data is hosted, and further determine that Domain 3" is associated with source system database "DB_A01" where its data is hosted, based on activating and invoking the respective data domain-database mapping component 210 of the unified data layer system component 146. Subsequently, the query splitter component 246 may split the first domain-based query into one or more split first queries for each of the databases. For instance, the query splitter component 246 may construct a split domain-based query for each of the "Domain 1" and "Domain 3", and further construct one or more split first queries for each of the source system databases "DB01", "DB02", "DB03", and "DB_A01" in accordance with server technology and rules of the associated servers "server 1", "server 2", "server 3", and "server 6" and associated schema "SCHM_DB01", "SCHM_DB02", "SCHM_DB03", and "SCHM_DB_A01".

In parallel with the splitting the first domain-based query by the query splitter component 246, the query optimization component 248 is structured to optimize the first domain-based query to be compatible with the unified data layer system component 146. In this regard, the query optimization component 248 transforms and optimizes the first domain-based query so that it can be executed by the unified data layer system component 146, e.g., by transforming its structure, syntax, etc. In this regard, the query optimization component 248 is structured to identify, remediate and resolve issues in run-time. Here, the query optimization component 248 is structured to detect any errors or inconsistencies in the schema of the databases themselves. For instance, the query optimization component 248 may determine that schema "SCHM_DB02" of database "DB02" is erroneous in itself and determine that constructing the query in accordance with this incorrect schema would result in incorrect results, improperly formatted results, corrupt data and/or the like, even though the underlying data in the database is correct. Accordingly, the query optimization component 248 may then modify the split domain-based query for database "DB02" to compensate for the identified defect in the schema "SCHM_DB02" such that the split domain-based query for database "DB02" would still deliver the correct results. As an example, if the system determines that schema "SCHM_DB02" incorrectly inserts a delimiter in the results, the query optimization component 248 may then embed a delimiter removal command in the split domain-based query for database "DB02", in run-time. In this manner, the invention obviates the need for waiting for a database control system to correct the issue at a future date thereby resulting in incorrect results, and resolves the issue during run-time thereby ensuring the data output will be correct irrespective of the defective schema of the respective database.

Next, the data extractor component 252 is structured to extract data from each of the plurality of databases (e.g., databases 184a-184n, and/or the like) via the corresponding one or more split first queries, in response to determining that optimization of the first domain-based query is complete, thereby ensuring that data can be extracted without errors. For instance, the data extractor component 252 may then extract relevant data associated with "Domain 1" and "Domain 3" from the source system databases "DB01", "DB02", "DB03", and "DB_A01". For instance, the system (e.g., via the data extractor component 252 of the query engine system component 148) may then extract relevant data associated with "Domain 1" from the source system database "DB02" and insert it into a staging temporary table 222 at the temporary memory locations 220 of the unified data layer system component 146 (as described later on with respect to FIGS. 3A-3B). The system (e.g., via the data extractor component 252 of the query engine system component 148) may then extract relevant data associated with "Domain 1" from the source system database "DB03" and insert it into a staging temporary table 222 at the temporary memory locations 220, such that it corresponds with the existing data extracted from "DB02" populated at the staging table previously (as described later on with respect to FIGS. 3A-3B). Moreover, system (e.g., via the data extractor component 252 of the query engine system component 148) may then extract relevant data associated with "Domain 3" from the source system database "DB_A01" and insert it into a staging temporary table 222 at the temporary memory locations 220, such that it corresponds with the existing data extracted from "DB01" and "DB02" populated at the staging table previously (as described later on with respect to FIGS. 3A-3B). Here, the data extractor component 252 is structured to establish operative communication links with each of the one or more servers associated with each of the plurality of databases, and extracting data from the one or more servers associated with each of the plurality of databases via the corresponding one or more split first queries.

In parallel with the data extraction by the data extractor component 252, the query generation component 254 is structured to generate a query plan and transmit it to an execution engine component 260. In some embodiments, the query plan comprises instructions for the execution engine component 260 regarding data extraction, such that the instructions are customized to the particular data domains from which data is to be extracted. The execution engine component 260 may then collate extracted data from each of the plurality of databases (182, 184a-184n) based on the associated plurality of split domain-based queries associated with the one or more data domains. For instance, the execution engine component 260 of the query engine system component 148) may construct a data output using the extracted data from the plurality of databases populated at the staging temporary table 222 at the temporary memory locations 220 (as described later on with respect to FIGS. 3A-3B) in accordance with the generated query plan, and subsequently transmit it to the user device. In this manner, the invention is structured to extract data from individual databases irrespective of the particular database where the domain is hosted. In this regard, the system generates an individual query for each database, and separately extracts data from each database. Through this real-time micro processing via the query engine system component 148, the distributed queries generated for the specific databases are always accurate and compatible with the respective databases, because the most recent data domain database mapping is employed in real-time. As such, any changes to the source databases are reflected in real-time at the data domain database mapping schema attributes, ensuring that the most current attributes are employed at all times.

FIG. 3A depicts a schematic block diagram depiction 300A of the unified data layer system component 146, in accordance with one embodiment of the invention. FIG. 3B depicts a non-limiting exemplary depiction 300B of a data domain-database mapping component 210, in accordance with one embodiment of the invention. As described previously, the unified data layer system component 146 is in operative communication with the query execution engine system component 148, and comprises metadata 202, one or more data dictionaries (data dictionary domain 1 204a, data dictionary domain 2 204b, data dictionary domain 3 204c, . . . , and/or data dictionary domain N 204n), and a data domain-database mapping component 210.

Here, the metadata 202 comprises data dictionaries associated with various data domains, and is a centralized repository of metadata. The metadata is directed to structural, descriptive and administrative data about the data dictionaries of various domains, and not the content of the data associated with various domains. As such, the metadata 202 may comprise metadata associated with one or more data dictionaries (data dictionary domain 1 204a, data dictionary domain 2 204b, data dictionary domain 3 204c, . . . , and/or data dictionary domain N 204n). As a non-limiting example, "Domain 1" may be associated with users of the entity network, and the metadata associated with the data dictionary domain 1 204a may comprise metadata associated with "Domain 1" and may comprise names of resource user fields contained in one or more databases. As another non-limiting example, "Domain 2" may be associated with resource activities associated with the entity network, and the metadata associated with the data dictionary domain 2 204b may comprise metadata associated with "Domain 2" and may comprise names of resource activity fields contained in one or more databases. As yet another non-limiting example, "Domain 3" may be associated with products associated with the entity network, and the metadata associated with the data dictionary domain 3 204c may comprise metadata associated with "Domain 3" and may comprise names of product fields contained in one or more databases. As yet another non-limiting example, "Domain 4" may be associated with resource values of the resource activities associated with entity network, and the metadata associated with the data dictionary domain N 204n may comprise metadata associated with "Domain N" and may comprise names of resource value fields contained in one or more databases.

The data domain-database mapping component 210 is structured to map the metadata associated with the domains from the one or more data dictionaries, with the specific attributes of the domain, for each of the plurality of domains (as illustrated by FIG. 3B). Specifically, each data domain may be associated with one or more databases. Moreover, each data domain may be associated with one or more schemas. Furthermore, each data domain may be associated with one or more servers. As a non-limiting example, "Domain 1" may be associated with users of the entity network, and "Domain 1" may be associated with source system databases "DB01", "DB02", and "DB03" where its data is stored, which may have schemas "SCHM_DB01", "SCHM_DB02", and "SCHM_DB03", respectively, along with servers "server 1", "server 2", and "server 3". As another non-limiting example, "Domain 2" may be associated with resource activities associated with the entity network, and "Domain 2" may be associated with source system databases "DB_201", and "DB_202" where its data is stored, which may have schemas "SCHM_DB_201", and "SCHM_DB_202", respectively, along with servers "server 4", and "server 5". As yet another non-limiting example, "Domain 3" may be associated with products associated with the entity network, and "Domain 3" may be associated with a source system database "DB_A01" where its data is stored, which may have schema "SCHM_DB_A01", at "server 6". As yet another non-limiting example, "Domain 4" may be associated with resource values of the resource activities associated with entity network, and "Domain 4" may be associated with source system databases "DB_A_B01", and "DB_A_B02" where its data is stored, which may have schemas "SCHM_DB_A_B01", and "SCHM_DB_A_B02", respectively, at servers "server 7", and "server 8".

The unified data layer system component 146 further comprises temporary memory locations 220 where collated data is staged during extraction, temporarily for a predetermined time period or until the data output is transmitted to the user device, after which the collated data may be purged from the temporary memory locations 220. Typically, staging of temporary extracted data or staging tables 222 may be hosted temporarily at the temporary memory locations 220. Here, the unified data layer system component 146 may collate, temporarily, the extracted data from the plurality of databases based on the associated plurality of split domain-based queries associated with the one or more data domains in a temporary staging memory location 220. As a non-limiting example, the user input may request extraction of data associated with one or more data components. Here, the system may determine that the user request and the one or more data components are associated with data domains "Domain 1" and "Domain 3" based on comparing extracted and transformed data from the user request with metadata 202 from data dictionaries 204a-204n. Next, the system (e.g., via the query splitter component 246 of the query engine system component 148) may determine that "Domain 1" is associated with source system databases "DB01", "DB02", and "DB03" where its data is hosted, and further determine that Domain 3" is associated with source system database "DB_A01" where its data is hosted, based on activating and invoking the respective data domain-database mapping component 210 of the unified data layer system component 146. Here, the system (e.g., via the query splitter component 246 of the query engine system component 148) may construct a split domain-based query for each of the "Domain 1" and "Domain 3", and further construct one or more split first queries for each of the source system databases "DB01", "DB02", "DB03", and "DB_A01" in accordance with server technology and rules of the associated servers "server 1", "server 2", "server 3", and "server 6" and associated schema "SCHM_DB01", "SCHM_DB02", "SCHM_DB03", and "SCHM_DB_A01". The system (e.g., via the data extractor component 252 of the query engine system component 148) may then extract relevant data associated with "Domain 1" and "Domain 3"

from the source system databases "DB01", "DB02", "DB03", and "DB_A01". For instance, the system (e.g., via the data extractor component 252 of the query engine system component 148) may then extract relevant data associated with "Domain 1" from the source system database "DB02" and insert it into a staging temporary table 222 at the temporary memory locations 220. The system (e.g., via the data extractor component 252 of the query engine system component 148) may then extract relevant data associated with "Domain 1" from the source system database "DB03" and insert it into a staging temporary table 222 at the temporary memory locations 220, such that it corresponds with the existing data extracted from "DB02" populated at the staging table previously. Moreover, system (e.g., via the data extractor component 252 of the query engine system component 148) may then extract relevant data associated with "Domain 3" from the source system database "DB_A01" and insert it into a staging temporary table 222 at the temporary memory locations 220, such that it corresponds with the existing data extracted from "DB01" and "DB02" populated at the staging table previously. The system (e.g., via the execution engine component 260 of the query engine system component 148) may then construct a data output using the extracted data from the plurality of database populated at the staging temporary table 222 at the temporary memory locations 220 in accordance with the generated query plan, and subsequently transmit it to the user device.

The unified data layer system component 146 further comprises a metadata synchronization component 212. The metadata synchronization component 212 is structured to process metadata associated with the plurality of databases (e.g., databases 184a-184n, and/or the like), dynamically and in real-time. In this manner, the metadata synchronization component 212 may determine, dynamically and in real-time, any changes in data storage at a databases based on identifying a modification to the metadata, and update the respective data dictionaries 204a-204n associated based on the modification to the metadata. This triggers a dynamic update to the respective data domain database mapping component 210 as well. Through this real-time micro processing via the query engine system component 148 and the unified data layer system component 146, the distributed queries generated for the specific databases are always accurate and compatible with the respective databases, because the most recent data domain database mapping 210 is employed in real-time.

FIG. 4 depicts a schematic block diagram and process flow depiction 400 of metadata synchronization, in accordance with one embodiment of the invention. As described above, the unified data layer system component 146 further comprises metadata 202 associated with data domain dictionaries 204a-204n and a metadata synchronization component 212. The metadata synchronization component 212 is structured to process metadata associated with the plurality of databases (e.g., databases 184a-184n, and/or the like), dynamically and in real-time. In this manner, the metadata synchronization component 212 may determine, dynamically and in real-time, any changes in data storage at a databases based on identifying a modification to the metadata, and update the respective data dictionaries 204a-204n associated based on the modification to the metadata. In this regard, the metadata synchronization component 212 comprises a metadata change sensor and applier 214 that is structured to identify any changes in the metadata and replicate the same changes the respective data dictionaries 204a-204n and respective data domain database mapping component 210, in-real time. In this regard, the metadata change sensor and applier 214 may trigger a dynamic data system 270 for monitoring the metadata. The dynamic data system 270 may comprise a messaging system or messaging queue tools and associated application programming interfaces (APIs), which through database triggers facilitate updating of the data dictionaries through the unified data layer 146.

Here, the metadata change sensor and applier 214 together with the dynamic data system 270 may process metadata associated with the plurality of databases, dynamically and in real-time; determine, dynamically and in real-time, a change in data storage at a database based on identifying a modification to the metadata; and update the data dictionaries associated with a unified data layer system component based on the modification to the metadata. Accordingly, even if there is a change in an existing database, the change is replicated across the analytical platform of the invention.

FIG. 5 depicts a schematic block diagram and process flow depiction 500 of a query processor, in accordance with one embodiment of the invention. As described previously with respect to FIG. 2, the query processor 240 comprises a process component 241 (e.g., comprising an input component 242, and a query parsing component 244), a query splitter component 246, and a data extractor component 252 (e.g., as a part of the parallel processing components 250).

Here, the process component 241 (e.g., via the input component 242, and the query parsing component 244) may receive a request for extracting one or more data components, transform the user input into a first domain-based query, and determine one or more associated data domains associated with the first domain-based query. The process component 241 may then transmit the determined data domains and the domain based query to the query splitter component 246. The query splitter component 246 may the analyze the data domains and the domain based query. The query splitter component 246 may then extract metadata relevant to the data domains from the data domain database mapping component 210 of the unified data layer 146. Subsequently, the query splitter component 246 is structured to automatically split the constructed first domain-based query into one or more split first queries, wherein each of the plurality of split domain-based queries is associated with at least one of the one or more data domains, in conjunction with the data domain-database mapping component 210 associated with a unified data layer system component 146, in accordance with the metadata. Next, the system 105 causes the data extractor component 252 to extract data from each of the plurality of databases (e.g., databases 184a-184n, and/or the like) via the corresponding one or more split first queries. The data extractor component 252 via the system 105 may then extract stored data from each of the plurality of databases based on the associated plurality of split domain-based queries associated with the one or more data domains.

FIG. 6 depicts a schematic block diagram and process flow depiction 600 of a query engine system component, in accordance with one embodiment of the invention. Here, the execution plan from the query processor 240 may be transmitted to the execution engine component 260. Here, the unified data layer pointer component 262, via the table mapping 610 (e.g., similar to data domain-database mapping component 210), may construct a data pointer for each of the one or more servers, and embed the one or more data pointers into the one or more split first queries. The data pointers are structured to point to the specific location of the data, and connects the different schemas for different functional systems. The execution component 264, together with the data cleanser component may construct the query result output 620. Here, the data cleanser may correctly format the data, resolve any incorrect correlations, and/or the like. The execution component may construct a data output in the form of query results 620 using the extracted data from the plurality of databases populated at the staging temporary tables at the temporary memory locations of the unified data layer system component 146 (as described later on with respect to FIGS. 3A-3B), and subsequently transmit it to the user device.

FIGS. 7A and 7B illustrate a high level process flow 700A-700B for multimodal and distributed database system structured for dynamic latency reduction, in accordance with some embodiments of the invention. In particular, the high level process flow is structured for mapping a plurality of data storage mechanisms to a common abstraction via a unified data layer and heterogenous domain based data extraction without requiring input of schema-based queries via a query engine. These steps are typically performed by processor 138 (also referred to as the first processor) of the control system 106 based on executing computer readable/executable instructions/code of the processing system/control application 144.

At block 702, the system may receive, from a user device, a user input associated with a request for extracting one or more data components from one or more data sources. Here, the user may select data components such as the functional areas of entities and/or associated domains from which data is desired or provide the user input in a natural/speech language format, via the user device application 122. As a non-limiting example, the user input may indicate that the user is requesting data associated with data domains of data components: network event type 1 and entity location B. In some instances, data domain may refer to the collection of data associated with the data component (e.g., data associated with data components: network event type 1 and entity location B).

Next, at block 704, the system may transform the user input into a first domain-based query, wherein the first domain-based query is a Structured Query Language (SQL) query. As discussed, the user may merely select the functional areas of entities and/or associated domains from which data is desired or provide the user input in a natural/speech language format, via the user device application 122. The system (e.g., via input component 242 of the query execution engine system component 148) may then analyze the user's selections and transform them into the first domain-based query. Here, the system may construct the first domain-based query by constructing normalized terminology for the user's selections, determine and insert query operators (e.g., query operators such as "join", etc.), and transform the user input to a domain based format.

At block 706, the system may determine (i) one or more data components and (ii) one or more associated data domains associated with the first domain-based query by parsing the user input based on derived metadata from data dictionaries associated with a unified data layer system component. As detailed previously, the system, via the query parsing component 244 analyzes the first domain-based query constructed by the input component 242. Here, the system determines one or more data components (e.g., network event type 1, entity location B, and/or the like) whose domain data the user desires, by identifying the associated terminology in the user input. In this regard, the system invokes metadata 202 associated with data dictionary domains 204 (204a, 202b, 204c, . . . , 204n) of the unified data layer system component 146. The system determines one or more associated data domains associated with the first domain-based query by parsing the user input based on derived metadata 202 from data dictionaries (204a, 202b, 204c, . . . , 204n) and data domain-database mapping component 210 associated with the unified data layer system component 146. For instance, the system may determine that the user request and the one or more data components are associated with data domains "Domain 1" and "Domain 3" based on comparing extracted and transformed data from the user request with metadata 202 from data dictionaries 204a-204n.

At block 708, the system may determine a plurality of databases associated with the determined one or more data domains. For instance, the system (e.g., via the query splitter component 246 of the query engine system component 148) may determine that "Domain 1" is associated with source system databases "DB01", "DB02", and "DB03" where its data is hosted, and further determine that Domain 3" is associated with source system database "DB_A01" where its data is hosted, based on activating and invoking the respective data domain-database mapping component 210 of the unified data layer system component 146. At block 710, the system may construct a plurality of split domain-based queries based on the first domain-based query, comprising constructing a split domain-based query for each of the plurality of databases, wherein each of the plurality of split domain-based queries is associated with at least one of the one or more data domains. For instance, the system (e.g., via the query splitter component 246 of the query engine system component 148) may construct a split domain-based query for each of the "Domain 1" and "Domain 3", and further construct one or more split first queries for each of the source system databases "DB01", "DB02", "DB03", and "DB_A01" in accordance with server technology and rules of the associated servers "server 1", "server 2", "server 3", and "server 6" and associated schema "SCHM_DB01", "SCHM_DB02", "SCHM_DB03", and "SCHM_DB_A01".

The query splitter component 246 is structured to automatically split the constructed first domain-based query into one or more split first queries. Here, the query splitter component 246 is structured to determine a plurality of databases (e.g., databases 184a-184n, and/or the like) associated with the determined one or more data domains in the user input. Subsequently, the query splitter component 246 may split the first domain-based query into one or more split first queries for each of the databases. For instance, the system (e.g., via the query splitter component 246 of the query engine system component 148) may construct a split domain-based query for each of the "Domain 1" and "Domain 3", and further construct one or more split first queries for each of the source system databases "DB01", "DB02", "DB03", and "DB_A01" in accordance with server technology and rules of the associated servers "server 1", "server 2", "server 3", and "server 6" and associated schema "SCHM_DB01", "SCHM_DB02", "SCHM_DB03", and "SCHM_DB_A01".

In parallel with the splitting the first domain-based query by the query splitter component 246, the query optimization component 248 is structured to optimize the first domain-based query to be compatible with the unified data layer system component 146. In this regard, the query optimization component 248 transforms and optimizes the first domain-based query so that it can be executed by the unified data layer system component 146, e.g., by transforming its structure, syntax, etc. In this regard, the query optimization component 248 is structured to identify, remediate and resolve issues in run-time. Here, the query optimization component 248 is structured to detect any errors or inconsistencies in the schema of the databases themselves. For instance, the query optimization component 248 may determine that schema "SCHM_DB02" of database "DB02" is erroneous in itself and determine that constructing the query in accordance with this incorrect schema would result in incorrect results, improperly formatted results, corrupt data and/or the like, even though the underlying data in the database is correct. Accordingly, the query optimization component 248 may then modify the split domain-based query for database "DB02" to compensate for the identified defect in the schema "SCHM_DB02" such that the split domain-based query for database "DB02" would still deliver the correct results. As an example, if the system determines that schema "SCHM_DB02" incorrectly inserts a delimiter in the results, the query optimization component 248 may then embed a delimiter removal command in the split domain-based query for database "DB02", in run-time. In this manner, the invention obviates the need for waiting for a database control system to correct the issue at a future date thereby resulting in incorrect results, and resolves the issue during run-time thereby ensuring the data output will be correct irrespective of the defective schema of the respective database.

Next, the data extractor component 252 is structured to extract data from each of the plurality of databases (e.g., databases 184a-184n, and/or the like) via the corresponding one or more split first queries, in response to determining that optimization of the first domain-based query is complete, thereby ensuring that data can be extracted without errors. As a non-limiting example, the system (e.g., via the data extractor component 252 of the query engine system component 148) may extract relevant data associated with "Domain 1" and "Domain 3" from the source system databases "DB01", "DB02", "DB03", and "DB_A01". For instance, the system (e.g., via the data extractor component 252 of the query engine system component 148) may then extract relevant data associated with "Domain 1" from the source system database "DB02" and insert it into a staging temporary table 222 at the temporary memory locations 220. The system (e.g., via the data extractor component 252 of the query engine system component 148) may then extract relevant data associated with "Domain 1" from the source system database "DB03" and insert it into a staging temporary table 222 at the temporary memory locations 220, such that it corresponds with the existing data extracted from "DB02" populated at the staging table previously. Moreover, system (e.g., via the data extractor component 252 of the query engine system component 148) may then extract relevant data associated with "Domain 3" from the source system database "DB_A01" and insert it into a staging temporary table 222 at the temporary memory locations 220, such that it corresponds with the existing data extracted from "DB01" and "DB02" populated at the staging table previously (as described previously with respect to FIGS. 3A-3B).

In parallel with the data extraction by the data extractor component 252, the query generation component 254 is structured to generate a query plan and transmit it to an execution engine component 260. In some embodiments, the query plan comprises instructions for the execution engine component 260 regarding data extraction, such that the instructions are customized to the particular data domains from which data is to be extracted. The system (e.g., via the execution engine component 260 of the query engine system component 148) may then construct a data output using the extracted data from the plurality of database populated at the staging temporary table 222 at the temporary memory locations 220 in accordance with the generated query plan.

At block 712, the system may extract stored data from each of the plurality of databases based on the associated plurality of split domain-based queries associated with the one or more data domains. As a non-limiting example discussed previously, the system (e.g., via the data extractor component 252 of the query engine system component 148) may extract relevant data associated with "Domain 1" and "Domain 3" from the source system databases "DB01", "DB02", "DB03", and "DB_A01". For instance, the system (e.g., via the data extractor component 252 of the query engine system component 148) may then extract relevant data associated with "Domain 1" from the source system database "DB02" and insert it into a staging temporary table 222 at the temporary memory locations 220. The system (e.g., via the data extractor component 252 of the query engine system component 148) may then extract relevant data associated with "Domain 1" from the source system database "DB03" and insert it into a staging temporary table 222 at the temporary memory locations 220, such that it corresponds with the existing data extracted from "DB02" populated at the staging table previously. Moreover, system (e.g., via the data extractor component 252 of the query engine system component 148) may then extract relevant data associated with "Domain 3" from the source system database "DB_A01" and insert it into a staging temporary table 222 at the temporary memory locations 220, such that it corresponds with the existing data extracted from "DB01" and "DB02" populated at the staging table previously (as described previously with respect to FIGS. 3A-3B).

At block 714, the system may construct a data output using the extracted data from the plurality of databases based on the one or more data components of the user input. The system (e.g., via the execution engine component 260 of the query engine system component 148) may then construct a data output using the extracted data from the plurality of database populated at the staging temporary table 222 at the temporary memory locations 220 in accordance with the generated query plan. At block 716, the system may transmit the data output to the user device and cause a presentation of the data output at a display device of the user device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A multimodal and distributed database system structured for dynamic latency reduction, wherein the system comprises a unified data layer structured to map a plurality of data storage mechanisms to a common abstraction and a query engine structured for heterogenous domain based data extraction without requiring input of schema-based queries, comprising:

a communication device, wherein the communication device is configured to establish operative communication with a plurality of networked devices via an entity communication network;

a memory device with computer-readable program code stored thereon;

a processing device operatively coupled to the memory device and the communication device, wherein the processing device is configured to execute the computer-readable program code to:

receive, from a user device, a user input associated with a request for extracting one or more data components from one or more data sources;

transform the user input into a first domain-based query;

determine (i) one or more data components and (ii) one or more associated data domains associated with the first domain-based query by parsing the user input based on derived metadata from data dictionaries associated with a unified data layer system component;

determine a plurality of databases associated with the determined one or more data domains;

construct a plurality of split domain-based queries based on the first domain-based query, comprising constructing a split domain-based query for each of the plurality of databases, wherein each of the plurality of split domain-based queries is associated with at least one of the one or more data domains, wherein constructing the plurality of of split domain-based queries, further comprises:
in a first processing sequence, (i) splitting, via a query splitter component, the first domain-based query based on at least the one or more data components to generate one or more split first queries, and in response (ii) extracting, via a data extractor component, data from each of the plurality of databases via the corresponding one or more split first queries;
in a second processing sequence, (i) optimizing, via a query optimizer component, the first domain-based query to be compatible with the unified data layer system component, and in response (ii) generate, via a query generation component, a query plan comprising customized instructions for the one or more data domains;
wherein the data from each of the plurality of databases is extracted via the data extractor component in the first processing sequence in response to completion of optimizing, via a query optimizer component, the first domain-based query of the second processing sequence; and
wherein the query plan is generated via the query generation component in the second processing sequence in response to completion of extracting, via a data extractor component, data from each of the plurality of databases of the first processing sequence;
extract stored data from each of the plurality of databases based on the associated plurality of split domain-based queries associated with the one or more data domains;
construct a data output using the extracted data from the plurality of databases based on the one or more data components of the user input; and
transmit the data output to the user device and cause a presentation of the data output at a display device of the user device.

2. The system of claim 1, wherein the first domain-based query is a Structured Query Language (SQL) query.

3. The system of claim 1, wherein the processing device is further configured to execute the computer-readable program code to: synchronize data from the one or more databases with the unified data layer system component based on a data domain-database mapping component.

4. The system of claim 1, wherein:
optimizing the first domain-based query to be compatible with the unified data layer system component further comprises:
detecting a first error in a schema of a first database of the plurality of databases determined associated with the determined one or more data domains such that constructing the first domain based query based on the schema is structured to produce incorrect results;
during run-time, modifying the one or more split first queries to compensate for the first error in the schema, such that extracting data from each of the plurality of databases via the modified one or more split first queries is structured to remediate the incorrect results.

5. The system of claim 4, wherein splitting the first domain-based query, further comprises:
determining one or more servers associated with each of the plurality of databases;
determining stored data to be extracted from each of the one or more servers associated with each of the plurality of databases; and
generating the one or more split first queries to be compatible with the associated one or more servers.

6. The system of claim 4, wherein splitting the first domain-based query, further comprises:
constructing a data pointer for each of one or more servers associated with each of the plurality of databases; and
embedding the one or more data pointers into the one or more split first queries.

7. The system of claim 4, wherein extracting data from each of the plurality of databases, further comprises:
establishing operative communication links with each of one or more servers associated with each of the plurality of databases; and
extracting data from the one or more servers associated with each of the plurality of databases via the corresponding one or more split first queries.

8. The system of claim 1, wherein the processing device is further configured to execute the computer-readable program code to:
collate, temporarily, the extracted data from the plurality of databases based on the associated plurality of split domain-based queries associated with the one or more data domains in a temporary staging memory location.

9. The system of claim 1, wherein the processing device is further configured to execute the computer-readable program code to:
process metadata associated with the plurality of databases, dynamically and in real-time;
determine, dynamically and in real-time, a change in data storage at a database based on identifying a modification to the metadata; and
update the data dictionaries associated with a unified data layer system component based on the modification to the metadata.

10. A computer program product for multimodal and distributed database system structured for dynamic latency reduction, wherein the computer program product is configured for mapping a plurality of data storage mechanisms to a common abstraction via a unified data layer and heterogenous domain based data extraction without requiring input of schema-based queries via a query engine, the computer program product comprising a non-transitory computer-readable storage medium having computer-executable instructions for causing a computer processor to:
receive, from a user device, a user input associated with a request for extracting one or more data components from one or more data sources;
transform the user input into a first domain-based query;
determine (i) one or more data components and (ii) one or more associated data domains associated with the first domain-based query by parsing the user input based on derived metadata from data dictionaries associated with a unified data layer system component;
determine a plurality of databases associated with the determined one or more data domains;
construct a plurality of split domain-based queries based on the first domain-based query, comprising constructing a split domain-based query for each of the plurality of databases, wherein each of the plurality of split domain-based queries is associated with at least one of the one or more data domains, wherein constructing the plurality of split domain-based queries, further comprises:
  in a first processing sequence, (i) splitting, via a query splitter component, the first domain-based query based on at least the one or more data components to generate one or more split first queries, and in response (ii) extracting, via a data extractor component, data from each of the plurality of databases via the corresponding one or more split first queries;
  in a second processing sequence, (i) optimizing, via a query optimizer component, the first domain-based query to be compatible with the unified data layer system component, and in response (ii) generate, via a query generation component, a query plan comprising customized instructions for the one or more data domains;
  wherein the data from each of the plurality of databases is extracted via the data extractor component in the first processing sequence in response to completion of optimizing, via a query optimizer component, the first domain-based query of the second processing sequence; and
  wherein the query plan is generated via the query generation component in the second processing sequence in response to completion of extracting, via a data extractor component, data from each of the plurality of databases of the first processing sequence;
extract stored data from each of the plurality of databases based on the associated plurality of split domain-based queries associated with the one or more data domains;
construct a data output using the extracted data from the plurality of databases based on the one or more data components of the user input; and
transmit the data output to the user device and cause a presentation of the data output at a display device of the user device.

11. The computer program product of claim 10, wherein the first domain-based query is a Structured Query Language (SQL) query.

12. The computer program product of claim 10, wherein the non-transitory computer-readable storage medium further comprises computer-executable instructions for causing a computer processor to: synchronize data from the one or more databases with the unified data layer system component based on a data domain-database mapping component.

13. The computer program product of claim 10, optimizing the first domain-based query to be compatible with the unified data layer system component further comprises:
  detecting a first error in a schema of a first database of the plurality of databases determined associated with the determined one or more data domains such that constructing the first domain based query based on the schema is structured to produce incorrect results;
  during run-time, modifying the one or more split first queries to compensate for the first error in the schema, such that extracting data from each of the plurality of databases via the modified one or more split first queries is structured to remediate the incorrect results.

14. The computer program product of claim 10, wherein the non-transitory computer-readable storage medium further comprises computer-executable instructions for causing a computer processor to:
  collate, temporarily, the extracted data from the plurality of databases based on the associated plurality of split domain-based queries associated with the one or more data domains in a temporary staging memory location.

15. The computer program product of claim 10, wherein the non-transitory computer-readable storage medium further comprises computer-executable instructions for causing a computer processor to:
  process metadata associated with the plurality of databases, dynamically and in real-time;
  determine, dynamically and in real-time, a change in data storage at a database based on identifying a modification to the metadata; and
  update the data dictionaries associated with a unified data layer system component based on the modification to the metadata.

16. A computerized method for multimodal and distributed database system structured for dynamic latency reduction, wherein the computerized method is configured for mapping a plurality of data storage mechanisms to a common abstraction via a unified data layer and heterogenous domain based data extraction without requiring input of schema-based queries via a query engine, the computerized method comprising:
  receiving, from a user device, a user input associated with a request for extracting one or more data components from one or more data sources;
  transforming the user input into a first domain-based query;
  determining (i) one or more data components and (ii) one or more associated data domains associated with the first domain-based query by parsing the user input based on derived metadata from data dictionaries associated with a unified data layer system component;
  determining a plurality of databases associated with the determined one or more data domains;
  constructing a plurality of split domain-based queries based on the first domain-based query, comprising constructing a split domain-based query for each of the plurality of databases, wherein each of the plurality of split domain-based queries is associated with at least one of the one or more data domains, wherein constructing the plurality of split domain-based queries, further comprises:
    in a first processing sequence, (i) splitting, via a query splitter component, the first domain-based query based on at least the one or more data components to generate one or more split first queries, and in response (ii) extracting, via a data extractor component, data from each of the plurality of databases via the corresponding one or more split first queries;
    in a second processing sequence, (i) optimizing, via a query optimizer component, the first domain-based query to be compatible with the unified data layer system component, and in response (ii) generate, via a query generation component, a query plan comprising customized instructions for the one or more data domains;
    wherein the data from each of the plurality of databases is extracted via the data extractor component in the first processing sequence in response to completion of optimizing, via a query optimizer component, the first domain-based query of the second processing sequence; and
    wherein the query plan is generated via the query generation component in the second processing sequence in response to completion of extracting, via a data extractor component, data from each of the plurality of databases of the first processing sequence;

extracting stored data from each of the plurality of databases based on the associated plurality of split domain-based queries associated with the one or more data domains;

constructing a data output using the extracted data from the plurality of databases based on the one or more data components of the user input; and transmitting the data output to the user device and cause a presentation of the data output at a display device of the user device.

17. The computerized method of claim 16, wherein the first domain-based query is a Structured Query Language (SQL) query.

18. The computerized method of claim 16, wherein the computerized method further comprises: synchronizing data from the one or more databases with the unified data layer system component based on a data domain-database mapping component.

19. The computerized method of claim 16, wherein optimizing the first domain-based query to be compatible with the unified data layer system component further comprises:

detecting a first error in a schema of a first database of the plurality of databases determined associated with the determined one or more data domains such that constructing the first domain based query based on the schema is structured to produce incorrect results;

during run-time, modifying the one or more split first queries to compensate for the first error in the schema, such that extracting data from each of the plurality of databases via the modified one or more split first queries is structured to remediate the incorrect results.

20. The computerized method of claim 16, wherein the computerized method further comprises:

collating, temporarily, the extracted data from the plurality of databases based on the associated plurality of split domain-based queries associated with the one or more data domains in a temporary staging memory location.

* * * * *